Figure 1:
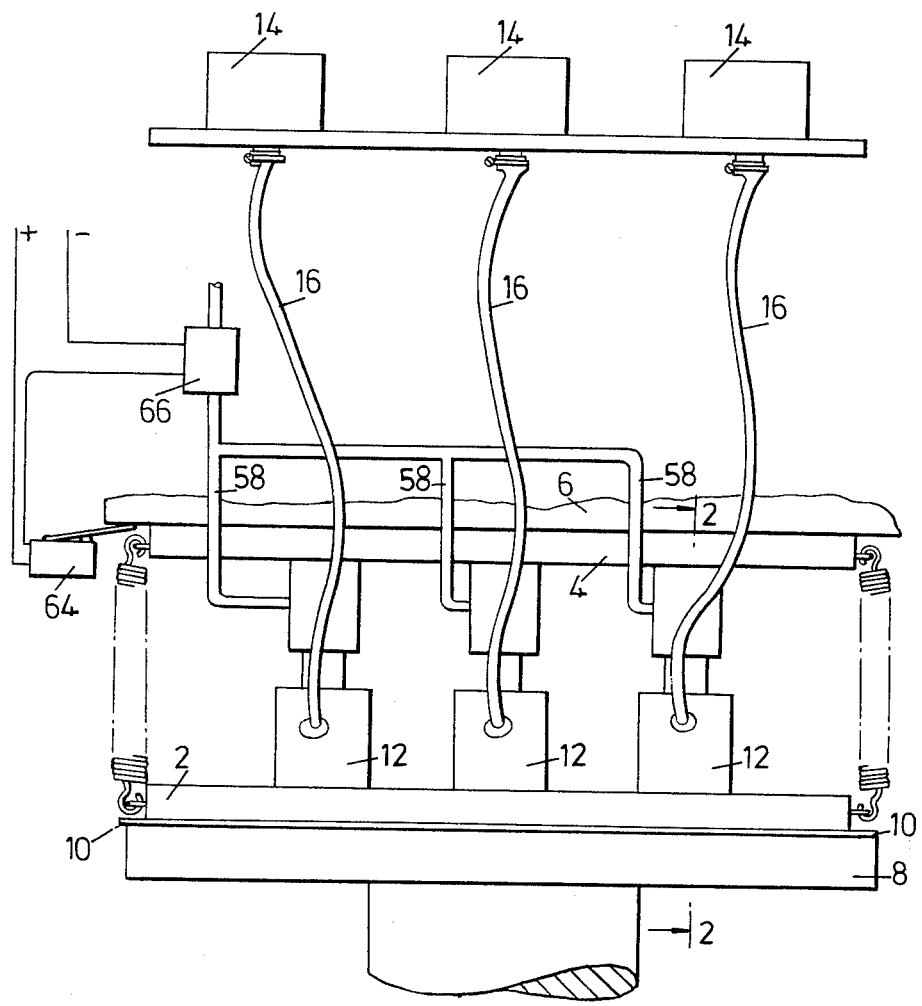

United States Patent [19]
Farrow et al.

[11] 3,949,669
[45] Apr. 13, 1976

[54] PROCESS AND METHOD IN PRINTING

[75] Inventors: Harold Frederick Farrow, Hitchin; William Henry Chudley, Henlow, both of England

[73] Assignee: Encoline (Process) Limited, England

[22] Filed: Mar. 8, 1974

[21] Appl. No.: 449,501

[30] Foreign Application Priority Data
Mar. 9, 1973 United Kingdom.............. 11536/73

[52] U.S. Cl................................. 101/151; 101/366
[51] Int. Cl.²........................................... B41F 1/40
[58] Field of Search........... 101/170, 150, 151, 171, 101/366; 264/328, 334

[56] References Cited
UNITED STATES PATENTS

| | | |
|---|---|---|
| 2,302,096 | 11/1942 | Battey.......................... 101/163 UX |
| 3,055,296 | 9/1962 | Farrow............................... 101/151 |
| 3,056,384 | 10/1962 | Beale et al. ..................... 101/194 X |
| 3,543,682 | 12/1970 | Farrow........................... 101/366 X |

OTHER PUBLICATIONS
"Multi–Color Printing From One Impression" British Printer, Sept., 1968.

Primary Examiner—J. Reed Fisher

[57] ABSTRACT

A method of intaglio printing adapted to produce a substantially flat article comprising bringing a die plate, recessed on its printing face to correspond with the required form of the article, against a substrate, injecting a settable material into the die recesses via passages through the thickness of the die plate to deposit material onto the substrate, separating the die plate from the substrate, allowing the material to set or partially set on the substrate and separating the article from the substrate.

15 Claims, 2 Drawing Figures

PROCESS AND METHOD IN PRINTING

This invention relates to a method of intaglio printing to produce a flat article and to printing apparatus in which a fluid printing material which is to be printed onto a substrate is fed into the recessed design or engraving of an intaglio die plate through the thickness of the plate.

In accordance with the invention a method of printing to produce a substantially flat article comprises bringing a die plate, recessed on its printing face to correspond with the required form of the article, against a substrate, injecting a settable material into the die recesses via passages through the thickness of the die plate to deposit material onto the substrate, separating the die plate from the substrate, allowing the material to set or partially set on the substrate and separating the article from the substrate. As an example the method is suitable for producing such articles as gaskets.

The substrate may for example be metallic (which may be coated with a release-compound) or a silicone release paper.

The method of the invention is, for example, suitable for the manufacture of gaskets.

In previously proposed intaglio printing machines of the type referred to, the feed means for the material to be printed operates under the action of printing pressure to pump the printing material through the passages in the thickness of the plate into the recesses in the printing surface of the plate. The printing material is pressurized by the printing pressure before an outlet valve opens to allow the material to reach the printing plate. As the valve initially opens the material is subject to considerable shear causing a risk, in the case of some relatively dense printing materials, of coagulation of the material. Further shear can be generated in a pressure relief valve if this is provided to prevent excess back pressure being generated in the recessed design.

Printing apparatus in accordance with the invention which is suitable for printing settable material comprises one or more material feed devices having a chamber with an inlet for connection to a supply of material to be printed and an outlet for connection to a recess of an intaglio printing plate, the outlet being controlled by a valve element connected to a diaphragm, piston or other movable member, which is biased to a position in which the valve element closes the outlet but which is so positioned and arranged as to be open to a connection for a supply of compressed fluid and when so subjected to the compressed fluid to open the valve against its bias.

This apparatus may be operated by feeding fluid printing material to the inlet to the chamber, opening the valve in the outlet from the chamber to provide communication between the chamber and one or more passages connecting with the recesses in the intaglio die plate through the thickness of the plate, closing the inlet to the chamber and then forcing printing material from the chamber through the said passages into the recesses in the die plate. The outlet valve is preferably opened by the direct action of the pressurised fluid, the printing material also being subjected to the pressure of the pressurised fluid (for example via a piston or diaphragm) to establish a slight reverse flow to close a non-return valve in the inlet. Once the inlet is closed further action of the pressurised fluid forces the printing material through the outlet into the recesses in the intaglio die plate.

In use a non-return valve is preferably provided in the printing material inlet or in the supply line. As the non-return valve must close before any substantial pressure can be generated in the printing material by displacement of the wall, the outlet valve is open before printing material can be urged through the outlet. This largely avoids the shear which the printing material would undergo if the outlet valve was initially opened only due to the pressure of the material acting thereon. Further, the back pressure in the recessed design can only balance, not exceed, that of the pressurised fluid (e.g. compressed air) so that provided this pressure is controlled suitably there is no need to relieve the printing material pressure and this avoids a second source of possible shear stress on viscous material to be printed.

The diaphragm or piston preferably divides the chamber so as to separate the printing material and the pressurised fluid, the valve poppet opening outwardly of the chamber and closing inwardly thereof.

Intaglio printing apparatus in accordance with the invention is provided with one or more of the feed devices. In the case of more than one feed device being provided these may each be connected to respective colours or other printing materials to feed to respective areas of the recessed design in the intaglio die plate so as to simultaneously print all of the colours or other materials.

One feed device may suffice when the apparatus is used in the method of manufacturing substantially flat articles in accordance with the invention.

Figure 2:
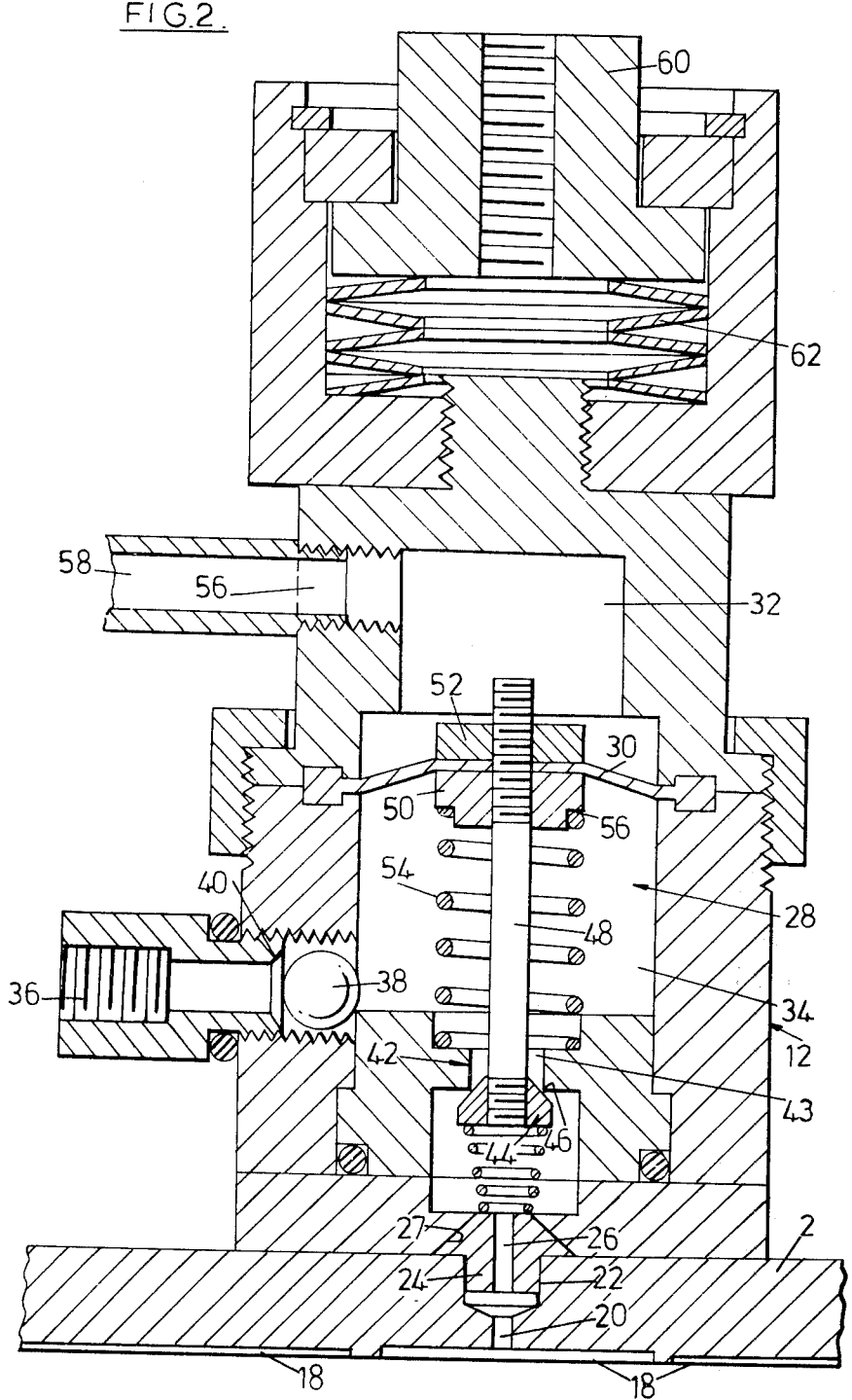

One embodiment of the invention will now be described, by way of example, with reference to the accompanying drawings in which:

FIG. 1 is a general schematic elevation of intaglio printing apparatus in accordance with the invention; and FIG. 2 is a detailed cross-sectional view of a printing material feed device on the line 2—2 in FIG. 1.

Referring to FIG. 1, an intaglio die plate 2 is supported from an upper support plate 4 mounted on an upper press platen 6. The platen 6 co-operates with a lower press platen 8 on which a substrate 10 to be printed is placed. When the apparatus is being used in the method of manufacturing substantially flat articles in accordance with the invention the substrate 10 may for example be a sheet of metal or of a silicone release paper. When the apparatus is used in conventional printing the substrate 10 may for example be a sheet of paper, however it is to be understood that the invention is applicable to any material to be printed whether or not in sheet form.

Fluid printing material is injected through the thickness of die plate 2 by one or more feed devices 12, three such devices being illustrated. The devices may each feed respective different coloured inks or paints to different parts of the recessed design in the printing face of the die in the manner described in the Complete Specification of our co-pending British Patent Application No. 10883/71. The apparatus will be further described, however, in respect of a method of manufacturing substantially flat articles such as gaskets and in this case the fluid printing material is a settable material which for example may set by curing after printing.

The feed devices 12 are supplied with suitable material from one or more reservoirs 14 via flexible conduits 16. The reservoirs may be under pressure and/or the feed from the reservoirs may be a gravity feed. In some cases a single feed device 12 may suffice.

The cross-section of one of the feed devices 12 and the die plate 2 is illustrated in FIG. 2. The underside of the die plate 2 is recessed at 18 to correspond with the required form of the article to be produced which may for example be a gasket. (In the case of conventional printing the recesses correspond to the design to be printed). A passage 20 is provided through the plate for supplying the settable "printing" material thereto and widens out at its upper end 22 to receive a resilient sealing plug 24 through which a passage 26 extends. The upper end of the plug 24 is conical and seals within a conical passage indicated at 27 in the lower end of the feed device 12.

The feed device 12 has a main chamber 28 divided by a resilient diaphragm 30 into an upper portion 32 and a lower portion 34. The lower chamber portion 34 is provided with an inlet 36 for printing material. A non-return valve constituted by a ball 38 and seating 40 is provided in the inlet to check reverse flow of printing material from the chamber portion 34.

The lower end of the chamber 28 communicates with the passage 26 through the plug 24 and thus through the passage 20 into the recesses 18 in the die plate. A poppet valve 42 controls the outlet passage 43 from the chamber 28 and is constituted by a poppet 44 which seals against an internal flange 46 in the chamber. The poppet 44 is mounted at the end of a stem 48 which is affixed to the diaphragm 30 by two threaded collars 50, 52 which are screwed onto the stem 48 to clamp the diaphragm between them. A compression spring 54 extends between a shoulder 56 of the collar 50 and the internal flange 46 to urge the diaphragm outwardly of the chamber portion 34 into the portion 32 thus closing the poppet valve 42.

The upper chamber portion 32 is provided with an inlet 56 for compressed air via a pneumatic pipe line 58.

In use pressure is applied to a piston member 60 by the upper press platen 4 and compresses a stack of belville washers 62 to urge through the wall of the feed device 12, the die plate 2 against the substrate 10 so as to establish a sealing pressure therebetween. As the platen 4 compresses the washers 62 it operates a micro switch 64 (see FIG. 1) which makes an electrical circuit between an electrical supply and a pneumatic solenoid valve 66. This valve opens to allow compressed air to flow through the line 58 to the inlet 56 and hence into the upper chamber portion 32. The air pressure urges the diaphragm 30 downwardly into the chamber portion 34 lifting the poppet 44 off its seat 46. The inward movement of the diaphragm also starts a slight reverse flow through the inlet 36 of the lower chamber 34, sufficient to close the non return valve 38, 40. Once this has closed, the poppet valve 42 already being open, the pressure in the chamber portion 34 can build up to urge the settable material to be printed and which is already present in the chamber portion 34, through the passages 43, 26 and 20 into the die recesses 18. Once the recesses 18 are full the back pressure balances the compressed air pressure and no further material flows.

The compressed air pressure is then released allowing the diaphragm to be returned by the spring 54, to the position illustrated closing the poppet valve 42 and sucking fresh material or allowing fresh material to flow through the inlet 36 and non-return valve 38, 40 to maintain the chamber portion 34 full of material to be printed in the next stroke of the press.

The upper press platen 4 is raised so separating the die 2 and substrate 10 which is now printed with a layer of settable material in the form of the die-recess 18. The settable material is allowed to set by placing the printed substrate in whatever ambient conditions are suitable and once set or partly set the article, e.g. a gasket, is separated from the substrate.

Clearly, many mechanisms other than that described, for providing a supply of compressed air to the chamber once the sealing pressure between the die plate 2 and substrate 10 has been established can alternately be employed.

It will be appreciated that the settable material is not subjected to undue shear stress due to the pressure of the material having to open a valve but rather the outlet valve is opened by the pressure of the separate supply of compressed air.

We claim:

1. A printing apparatus comprising wall means for defining a chamber having a first and second inlets and and an outlet, said outlet being connected in fluid communication with a printing plate, first conduit means for conducting fluid under pressure from a source of fluid pressure to said first inlet, second conduit means for conducting printing fluid to said second inlet, a flexible diaphragm dividing said chamber into first and second sections, said diaphragm being flexible from a first position to a second position under the influence of fluid pressure in said first section of said chamber, said first section of said chamber being connected in fluid communication with said first conduit means through first inlet, said second section of said chamber being connected in fluid communication with said second conduit means through said second inlet and with the printing plate through said outlet, outlet valve means for controlling a flow of fluid through said outlet, said outlet valve means being operable between an open condition enabling fluid to flow from said second section of said chamber through said outlet to the printing plate and a closed condition blocking fluid flow through said outlet, and connector means interconnecting said outlet valve means and said diaphragm for effecting operation of said outlet valve means from the closed condition to the open condition upon flexing of said diaphragm from said first position to said second position under the influence of fluid pressure in said first section of said chamber and for effecting operation of said outlet valve means from the open condition to the closed condition upon flexing of said diaphragm from said second position to said first position.

2. A printing apparatus as set forth in claim 1 further including compressible means connected with said wall means, means for compressing said compressible means from a first condition to a second condition upon initiation of a printing operation with said flexible diaphragm in said first position and said outlet valve means in the closed condition, flow control means for controlling the flow of fluid under pressure through said first conduit means, said flow control means being operable between a closed condition blocking fluid flow from the source of fluid pressure to said first inlet and an open condition enabling fluid to flow from the source of fluid pressure to said first inlet, and means for effecting operation of said flow control means from the closed condition to the open condition in response to compressing of said compressible means from the first condition to the second condition to enable fluid under pressure to flow through said first conduit means to said first section of said chamber to effect a flexing of said diaphragm from the first position to the second position and operation of said outlet valve means from the closed condition to the open condition under the influence of forces transmitted to said outlet valve means from said diaphragm by said rigid member.

3. An apparatus as set forth in claim 1 wherein said connector means includes a rigid member extending between said diaphragm and said outlet valve means, first means for fixedly connecting one end portion of said rigid member to said diaphragm, and second means for fixedly connecting an opposite end portion of said rigid member to said outlet valve means.

4. An apparatus as set forth in claim 1 further including spring means for urging said outlet valve means toward the closed condition and for urging said diaphragm toward the first position.

5. An apparatus as set forth in claim 1 further including check valve means operable from an open condition enabling fluid to flow through said second inlet to a closed position blocking fluid flow through said second inlet under the influence of a fluid flow from said second chamber section upon initiation of flexing of said diaphragm from said first position toward said second position, said means interconnecting said outlet valve means and said diaphragm including means for effecting operation of said outlet valve means to the open condition prior to operation of said check valve means from the open condition to the closed condition.

6. A printing apparatus comprising surface means for at least partially defining a chamber, a movable member within said chamber and dividing said chamber into first and second sections, said movable member being disposed in sealing engagement with said surface means to block fluid flow between said first and second sections of said chamber, said movable member being movable relative to said surface means from a first position to a second position to increase the size of said first section of said chamber and decrease the size of said second section of said chamber, first conduit means for connecting said fluid outlet in fluid communication with a printing plate, a valve member movable between a closed condition blocking fluid flow through said outlet and an open condition enabling fluid to flow from said second section of said chamber through said outlet and first conduit means to the printing plate, connector means fixedly connected to said valve member and said movable member for effecting movement of said valve member from the closed condition to the open condition upon movement of said movable member from said first position toward said second position and for effecting movement of said valve member from the open condition to the closed condition upon movement of said movable member from said second position to said first position, second conduit means for conducting printing fluid to said second section of said chamber, and third conduit means for conducting fluid under pressure to said first section of said chamber to thereby effect movement of said movable member from said first position to said second position.

7. A printing apparatus as set forth in claim 6 further including check valve means operable from an open condition enabling fluid to flow through said second conduit means to said second section of said chamber to a closed condition blocking fluid flow through said second conduit means upon movement of said movable member from said first position toward said second position, said connector means being operable to effect movement of said valve member from the closed condition to the open condition prior to operation of said check valve means from the open condition to the closed condition upon movement of said movable member from said first position toward said second position.

8. A printing apparatus as set forth in claim 6 wherein said movable member is a flexible diaphragm which is flexed from said first position to said second position under the influence of fluid pressure in said first section of said chamber, said connector means including an elongated rigid member which is fixedly connected at one end to said diaphragm and is fixedly connected at another end to said valve member.

9. A printing apparatus as set forth in claim 6 further including spring means disposed in said second section of said chamber for urging said movable member from said second position toward said first position.

10. A printing apparatus comprising a platen, a printing plate, a housing disposed between said platen and printing plate, first and second variable volume chamber means disposed within said housing for effecting a flow of printing fluid from said housing to said printing plate upon an increase in the volume of said first variable chamber means and a decrease in the volume of said second variable volume chamber means, first conduit means for conducting fluid under pressure to said first variable volume chamber means, second conduit means for conducting printing fluid to said second variable volume chamber means, a resiliently compressible means connected with said housing and disposed between said platen and printing plate, means for effecting relative movement between said platen and printing plate to decrease the distance therebetween and compress said compressible means upon initiation of a printing operation, flow control means operable from a closed condition blocking a flow of fluid from a source of fluid pressure to an open condition enabling fluid to flow from the source of fluid pressure through said first conduit means to said first variable volume chamber means, and means for effecting operation of said flow control means from the closed condition to the open condition in response to compression of said resiliently compressible means to enable fluid under pressure to flow into said first variable volume chamber means and thereby effect an increase in the volume of said first variable volume chamber means and a flow of printing fluid from said housing to said printing plate.

11. An apparatus as set forth in claim 10 wherein said means for effecting relative movement between said platen and printing plate includes means for pressing against a face surface of the printing plate a substrate on which printing fluid is to be deposited during a printing operation.

12. An apparatus as set forth in claim 10 wherein a portion of said first variable volume chamber means is defined by a first major side surface of a flexible diaphragm disposed within said housing and a portion of said second variable volume chamber means is defined by a second major side surface of said flexible diaphragm, said flexible diaphragm being movable from a first position to a second position under the influence of fluid pressure in said first variable volume chamber means to increase the volume of said first variable volume chamber means and decrease the volume of said second variable volume chamber means.

13. An apparatus as set forth in claim 12 further including outlet valve means operable from a closed condition blocking the flow of printing fluid from said housing to said printing plate to an open condition enabling printing fluid to flow from said housing, and actuator means interconnecting said diaphragm and said outlet valve means for effecting operation of said outlet valve means from the closed condition to the open condition upon movement of said diaphragm from said first position to said second position.

14. An apparatus as set forth in claim 13 wherein said actuator means includes a longitudinally extending rigid member fixedly connected at one end portion to said diaphragm and fixedly connected at an opposite end portion to said outlet valve means.

15. An apparatus as set forth in claim 13 further including check valve means operable from an open condition enabling fluid to flow through said second conduit means to said second variable volume chamber means to a closed condition blocking fluid flow through said second conduit means upon movement of said diaphragm from said first position toward said second position, said actuator means being operable to effect operation of said outlet valve means from the closed condition to the open condition prior to operation of said check valve means from the closed condition to the open condition upon movement of said diaphragm from said first position toward said second position.

* * * * *